May 10, 1938. K. WIEGAND 2,116,720
ELECTRIC DISCHARGE DEVICE
Filed May 7, 1936
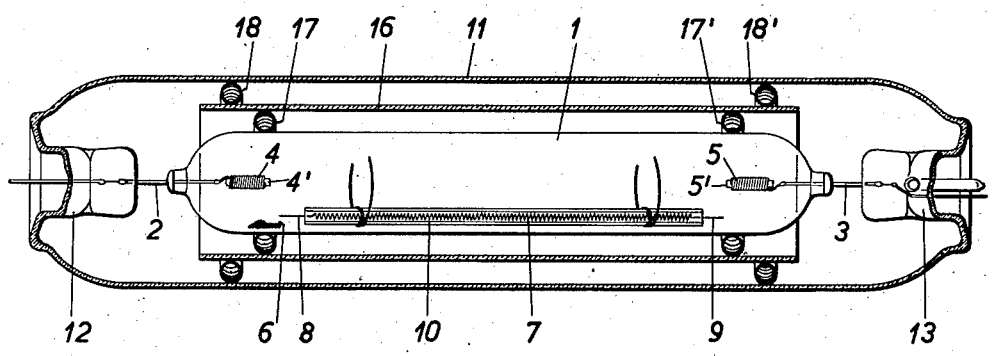
Inventor:
Kurt Wiegand,
by Harry E. Dunham
His Attorney.

Patented May 10, 1938

2,116,720

UNITED STATES PATENT OFFICE 2,116,720

ELECTRIC DISCHARGE DEVICE

Kurt Wiegand, Hohen-Neuendorf, near Berlin, Germany, assignor to General Electric Company, a corporation of New York Application May 7, 1936, Serial No. 78,500
In Germany May 14, 1935

3 Claims. (Cl. 176—122)

My invention relates to improvements in electric discharge devices, and more particularly in discharge devices of the type containing a vaporizable metal having a vaporization temperature higher than mercury, such as sodium, and a noble gas. The light intensity of such lamps falls off to a considerable degree in the course of service. For example in sodium vapour lamps the light intensity is reduced during the first 500 lamp hours on an average by 25 to 30% and thereafter during the following 1000 to 2000 lamp hours the light intensity further falls off by about 10 to 15%. Probably this reduction of the light intensity is caused by a reduction of the pressure of the metal vapour caused by impurities transmitted from the electrodes to the vaporizable metal, and by a reduction of the vacuum of the heat insulating jacket usual in lamps of this type.

The object of the improvement is to provide a discharge device of the class referred to in which the light intensity is more uniform, and in which more particularly a reduction of the light intensity at the beginning of the service of the lamp is obviated, and with this object in view, to the noble gas which is provided for facilitating ignition, intentionally a higher pressure is imparted than would be necessary in the lamp. I have found that the said pressure of the noble gas filling should be such that, when the cold lamp is first energized the consumption of electric energy is at least 15% higher than in ordinary service and after vaporization of the metal, and after the production of light has been transmitted to the electrically activated metal vapour. Practically this higher consumption of electric energy caused by an increased pressure of the noble gas is not objectionable, because the consumption of energy is automatically reduced to the normal as the vaporization of the metal continues, so that at the end of the starting period the lamp which has a higher pressure of the noble gas has the same consumption of energy as a lamp in which the pressure of the noble gas is normal. The increased pressure of the noble gas has the further advantage that in the course of service the pressure of the metal vapour is not reduced in an objectionable way, because, when the metal vapour even slightly falls off for the reason explained above, the consumption of energy is automatically increased, the higher pressure of the noble gas causing an increased vaporization of the metal by increased heating of the discharge receptacle and therefore an increased production of metal vapour, whereby the loss of metal vapour is compensated. Thus the light intensity of the device remains constant, and the small increase in the consumption of electric energy is not material as compared to the advantage of the reduction of light intensity being avoided. The increase of the pressure of the noble gas and the increased consumption of electric energy have the further advantage that the starting period is reduced. For example, when a sodium vapour lamp having the ordinary pressure of the noble gas requires about 12 minutes until the highest vaporization of the metal and the highest light intensity are attained, the same lamp in which the consumption of energy is increased by 30% and the pressure of the noble gas is increased from 7 mm. to 15 mm. acquires the same light intensity in about 6 minutes.

For the purpose of explaining the invention a sectional elevation of a sodium vapour lamp has been illustrated in the accompanying drawing.

The lamp comprises a tubular receptacle 1 having leading-in wires 2, 3 fused at its ends, the said leading-in wires being connected with glowing electrodes of a known or preferred construction. In the construction shown in the figure the said electrode consists of helically wound tungsten wires 4, 5 having rods 4′, 5′ inserted therein which rods are made from a suitable material adapted to emit electrons, such for example as a sintered mixture of barium oxide and tungsten. The tubular receptacle 1 contains a filling of a noble gas, such as neon, for facilitating ignition, and in addition a small amount of sodium 6 which is vaporized after the lamp has been energized. For further facilitating ignition a helically wound wire 7 is confined within the receptacle 1 which wire is entirely confined, with exception of its outwardly projecting ends 8 and 9, within a thin glass pipe 10. When voltage is applied to the glowing electrodes between the said electrodes and the ends 8, 9 of the helically wound wire 7 subsidiary glowing discharge takes place which assists the production of an arc discharge between the glowing electrodes 4 and 5. The tubular receptacle 1 in which the discharge takes place is confined within a receptacle 11 the wall of which is spaced from the receptacle 1 and which counteracts an objectionable radiation of heat, the leading-in wires 2, 3 being passed through the pinches 12, 13 in a vacuum tight manner. Preferably the space between the receptacles 1 and 11 is largely evacuated. In order to prevent radiation of heat as far as possible the inner receptacle 1 is surrounded by a glass jacket 16 which is open at both ends, and which is spaced from the inner and outer receptacles by rings 17, 17' and 18, 18' of helically wound wire.

It may be assumed that the lamp shown in the drawing has an inner diameter of 20 mm., that the distance between the electrodes is 200 mm., and that the filling of neon gas has a pressure of 5 mm. Hg. Ordinarily the consumption of energy of the said lamp is 50 watts, the said consumption being alike when the cold lamp is being charged and in service. Also the voltage of the lamp is the same in both cases and it is about 53 volts. The current intensity is about 1 ampere. If in the same lamp the pressure of the neon gas is increased to 15 mm. Hg the consumption of energy during the charging period is 60 watts, and the voltage 72 volts. If in the same lamp the pressure of the neon gas is further increased to 25 mm. Hg the consumption of energy is increased to 70 watts and the voltage to 85 volts. In ordinary service in both lamps in which the pressure of the noble gas is 15 and 25 mm. respectively the consumption of energy is 50 watts and the voltage 53 volts, because the sodium vapour which is gradually produced by the increased temperature of the wall of the receptacle reduces the voltage and therefore also the consumption of energy.

The pressure of the noble gas which is necessary in each case for attaining the result aimed at depends on the pressure at which the consumption of energy and the voltage of the lamp is alike in the cold state and in service. Starting from this pressure the pressure of the noble gas should be increased so far that an increase of the consumption of energy in the cold state of at least 15%, and preferably from 25 to 40% is attained. In the lamp in which the pressure of the noble gas necessary for obtaining uniform consumption of energy and uniform voltage is 15 mm., the pressure of the noble gas must be from 20 to 30 mm.

I claim:

1. An electric discharge device comprising a sealed receptacle containing thermionic, activated electrodes, a metal having a vaporization point higher than that of mercury and a starting gas, the pressure of said starting gas being such that the consumption of electric energy is at least 15% higher during the starting period of the device when the characteristic spectrum of the starting gas predominates in the light emitted by the discharge between said electrodes than during the operating period when the characteristic spectrum of the metal vapor predominates in the light emitted by said discharge to prevent a reduction in the light output from said metal vapor during the operation of the device.

2. An electric discharge device comprising a sealed receptacle containing thermionic, activated electrodes, sodium and a starting gas, the pressure of said starting gas being such that the consumption of electric energy is at least 15% higher during the starting period of the device when the characteristic spectrum of the starting gas predominates in the light emitted by the discharge between said electrodes than during the operating period when the characteristic spectrum of the sodium vapor predominates in the light emitted by said discharge to prevent a reduction in the light output from said sodium vapor during the operation of the device.

3. An electric discharge device comprising a sealed receptacle containing thermionic, activated electrodes, sodium and neon, the pressure of said neon being such that the consumption of electric energy is at least 15% higher during the starting period of the device when the characteristic spectrum of the neon predominates in the light emitted by the discharge between said electrodes than during the operating period when the characteristic spectrum of the sodium vapor predominates in the light emitted by said discharge to prevent a reduction in the light output from said sodium vapor during the operation of the device.

KURT WIEGAND.